United States Patent [19]

Caldwell

[11] Patent Number: 4,754,126

[45] Date of Patent: Jun. 28, 1988

[54] NIGHT DEPOSITORY METHOD AND APPARATUS

[75] Inventor: John P. Caldwell, Miamisburg, Ohio

[73] Assignee: NCR Corporation, Dayton, Ohio

[21] Appl. No.: 33,450

[22] Filed: Apr. 1, 1987

[51] Int. Cl.[4] .................... G06K 5/00

[52] U.S. Cl. .................... 235/379

[58] Field of Search .................... 235/379

[56] References Cited

U.S. PATENT DOCUMENTS

| | | | |
|---|---|---|---|
| 3,836980 | 9/1974 | Grosswiller, Jr. et al. | 346/22 |
| 3,897,901 | 8/1975 | Grosswiller, Jr. et al. | 232/44 |
| 3,937,925 | 2/1976 | Boothroyd | 235/61.7 B |
| 3,942,435 | 3/1976 | Aultz et al. | 101/44 |
| 3,943,335 | 3/1976 | Kinker et al. | 235/61.7 B |
| 3,963,900 | 6/1976 | Sawaguchi | 235/379 |
| 4,085,687 | 4/1978 | Beck et al. | 109/24.1 |
| 4,092,934 | 6/1978 | Sayer | 109/24.1 |
| 4,312,277 | 1/1982 | Graef et al. | 109/24.1 |
| 4,423,316 | 12/1983 | Sano et al. | 235/379 |
| 4,628,192 | 12/1986 | Suzuki | 235/1 R |

OTHER PUBLICATIONS

Hamilton Safe Night Depository Model 80 U.C. Publication (DE-001 ML-0182-0).

NCR ATM Systems 5085 Thru the Wall ATM Installation Guidelines Publication.

*Primary Examiner*—Harold I. Pitts

*Attorney, Agent, or Firm*—Wilbert Hawk, Jr.; Albert L. Sessler, Jr.

[57] ABSTRACT

A night depository is configured to be placed beneath and to support an automated teller machine, which is used by a customer to provide access to the night depository, and which provides documentation of customer access to the night depository. Access to the night depository is provided by a closure positioned vertically beneath the front of the automated teller machine. A conveyor within the night depository prevents piling up of deposits within the night depository beneath the closure. The conveyor carries the deposits to the vicinity of a second closure which may be opened by an authorized person to remove the accumulated deposits.

22 Claims, 8 Drawing Sheets

NIGHT DEPOSITORY METHOD AND APPARATUS

REFERENCE TO OTHER APPLLICATION

Night Depository or Similar Article, co-pending design application, Ser. No. 033,541, filed on even date herewith, invented by Alex Tarkeny, John P. Caldwell and Jay Sucre, assigned to NCR Corporation.

BACKGROUND OF THE INVENTION

In order to meet the demands of customers who must make deposits during non-business hours, banks and similar establishments frequently provide night depositories for receiving such deposits, which may be in the form of packages or containers holding substantial amounts of checks, currency, coins and other materials. Since bank employees are not on duty during non-business hours, access to night depositories must normally rely on a key or similar device given to the customer by the bank. No other means of establishing customer identification is normally provided, nor is means for issuing a receipt to establish that such a deposit has been made.

Some banking transactions can be carried on during non-business hours by the use of customer-operated automated teller machines, which are capable of performing customer identification functions, receiving deposits, issuing currency and providing an internal record and a printed receipt to the customer concerning the various transactions made.

The use of an automated teller machine in combination with a night depository enables the functions of customer identification, record keeping and receipt issuing to be performed in connection with use of the night depository. For convenience in use, the automated teller machine and the night depository should be located in close proximity to each other, and the night depository should be capable of receiving and holding a relatively large number of deposit packages or containers in a relatively limited space.

SUMMARY OF THE INVENTION

This invention relates to a night depository method and apparatus, and more particularly relates to the combination of an automated teller machine (ATM) and a night depository, whereby the customer can conveniently utilize both facilities in a single location, and whereby use of the night depository can be controlled by customer interaction with the ATM. The combination of the ATM and the night depository provides several advantages to financial institutions, including the following: receipt generation to the customer after a deposit has been made, which provides a dated record of the transaction; the ability for the ATM to sense a "full" condition in the depository and report to an associated host processor that such a condition exists; the ability of the ATM to prevent access to the depository during a "full" condition to prevent further deposits from being made which may otherwise not reach the safety of the interior of the depository due to a clog in the chute area; the ability to sense that the depository drawer was opened and that presumably a deposit was made; and the ability to provide the host processor with initial data regarding depository balances, based on reported entries by the ATM.

In accordance with a first embodiment of the invention, a method for receiving customer deposits in a night depository operatively associated with an ATM comprises the following steps: receiving at the ATM a customer entry of personal identification and transaction data; verifying the identity of the customer; releasing a latch means to enable the customer to open a closure of the night depository, make a deposit in the depository, and close the closure; enabling a deposit to drop into a conveyor area, which includes a conveyor, in the night depository; sensing, by a sensor, the height of deposits reposing in the conveyor area; operating the conveyor to reposition the deposits in the night depository when the height of the accumulated deposits exceeds a predetermined value as determined by the sensor; generating a signal by the depository to the ATM that the deposit has been made; recording the data pertaining to the transaction in the ATM; and issuing a receipt to the customer by the ATM relating to the deposit.

In accordance with a second embodiment of the invention, a night depository system for receiving customer deposits, maintaining a record of such deposits, and providing a receipt to a customer making such a deposit comprises, in combination: customer operated means for receiving customer identification and transaction data and for controlling access to a night depository; means for verifying the identity of the customer; a night depository for receiving customer deposits; closure means for the night depository to enable deposits to be placed within said night depository; latch means for said closure means controlled by said customer operated means; switch means operatively coupled to said closure means to provide a signal to said customer operated means as to whether said closure is opened or closed; conveyor means for transporting deposits which have been placed in the night depository to prevent such deposits from accumulating in a position adjacent to said closure means; sensing means for sensing when an accumulation of deposits adjacent said closure means exceeds a predetermined quantity; and motor means controlled by said sensing means for operating said conveyor means for moving said accumulated deposits from said position adjacent said closure means to a remote position.

It is accordingly an object of the present invention to provide a night depository for use in association with an ATM.

Another object is to provide a method for use of a night depository in association with an ATM.

Another object is to provide a night depository apparatus in which a record is issued to a customer making a deposit.

Another object is to provide a night depository apparatus in which access to the depository is prevented when the depository is full.

Another object is to provide a night depository apparatus in which customer identification must be verified as a condition for access to the depository.

Another object is to provide a night depository apparatus in which an ATM is positioned atop a night depository in such a manner that the night depository closure is positioned directly beneath the customer interface portion of the ATM for convenience in use by the customer.

With these and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION

Figure 1:
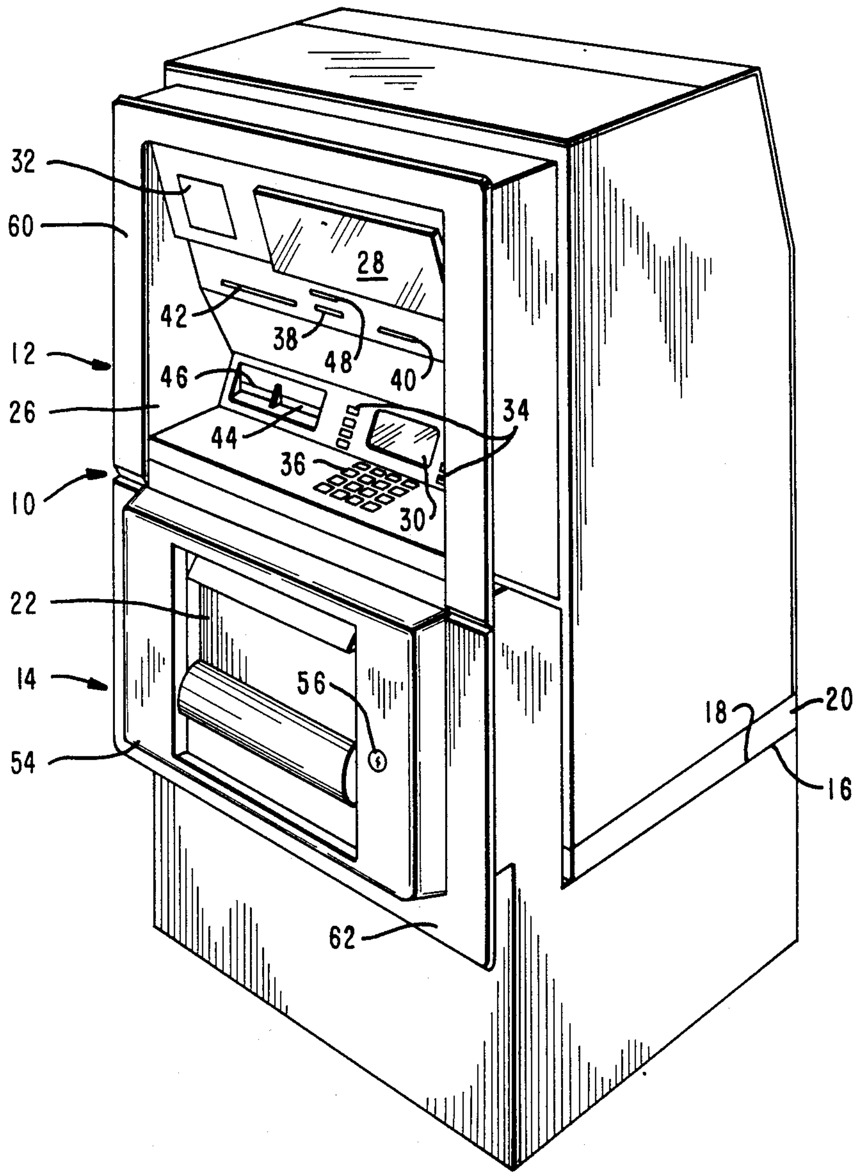
FIG. 1 is a perspective view showing the night depository system of the present invention, including a night depository and an automated teller machine in assembled relationship.
Figure 2:
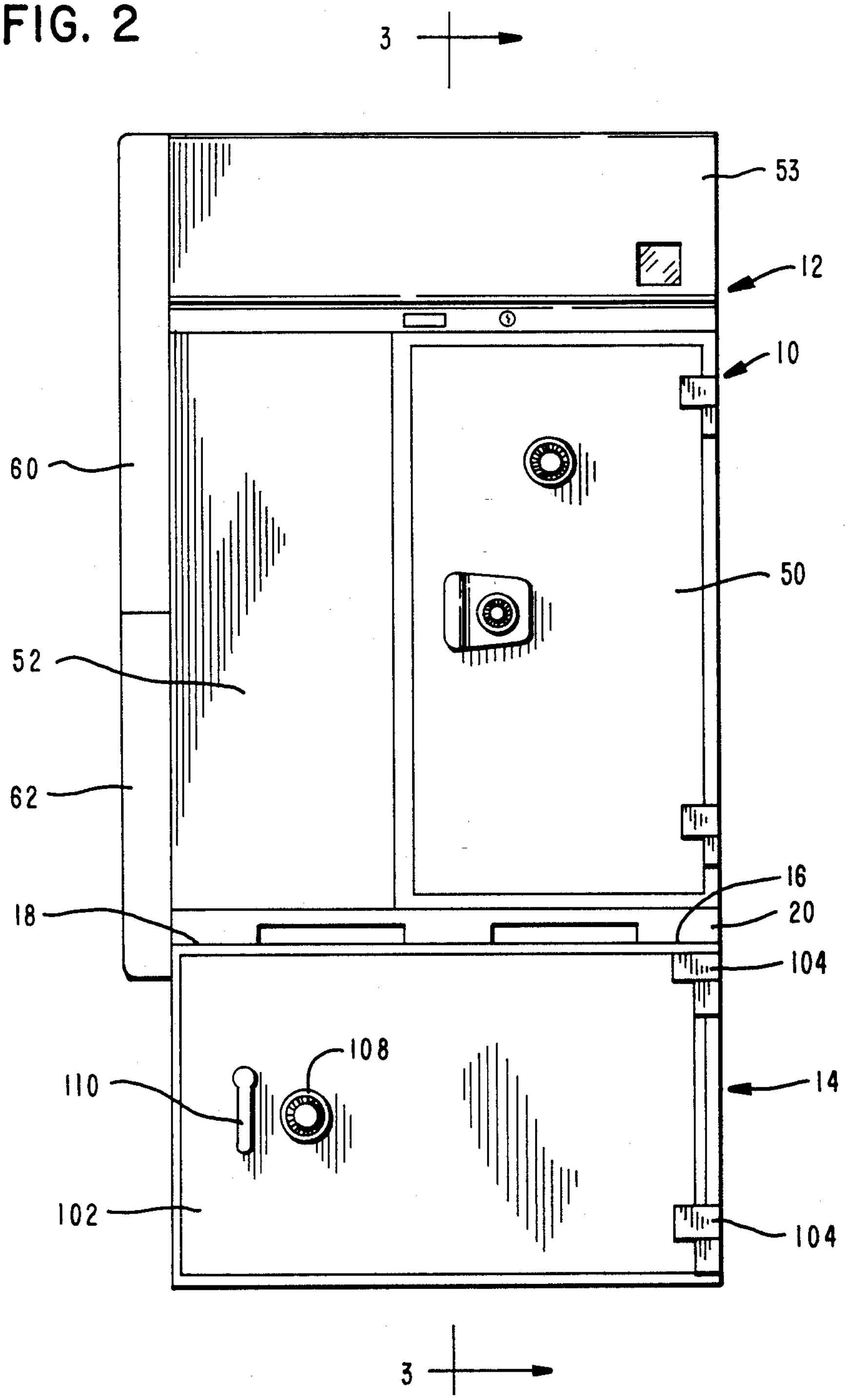
FIG. 2 is a rear view of the assembly of FIG. 2.

FIG. 1 shows, in a perspective view, a system 10 which comprises a combination of an automated teller machine (ATM) 12 and a night depository 14. The ATM may, for example, be an NCR 5085 ATM, manufactured by NCR Corporation, Dayton, Ohio. The night depository rests upon a floor or other supporting surface (not shown) and is configured to provide an upper external horizontal surface 16 upon which feet protruding from a complementary flat bottom surface 18 of a supporting frame 20 of the ATM 12 rest. It will be seen that this arrangement places a door 22 of a depository drum 24 (FIG. 3) directly below a customer interface area 26 of the ATM 12, so that a customer can conveniently operate both the ATM 12 and the door 22 while standing in one place. The customer interface area 26 of the ATM 12 normally includes such elements as a lamp 28, a display 30, an envelope receptacle 32, function control keys 34, a keyboard 36, a card slot 38 for receiving a customer's credit or bank card, receipt and statement dispensing slots 40 and 42, a slot 44 from which currency and associated documentation are dispensed, an envelope slot 46 for receiving deposits and similar items from a customer, and a display 48 indicating whether or not the ATM is in service. The deposits placed through the slot 46 are normally relatively small in size and are received in a relatively small safe area within the ATM proper, while deposits placed into the night depository 14 through door 22 are normally large and bulky deposits. At its rear, the ATM 12 is provided with a lockable door 50 for its self-contained safe and with access panels 52 and 53 to enable the internal mechanism and electronics of the ATM to be serviced.

The night depository door 22 is located in an outwardly projecting portion 54 of the night depository 14. Access to the interior of the night deposit 14 through the door 22 is controlled by a solenoid latch 58 which is actuated under control of the ATM 12, as will subsequently be described. Alternatively, if desired, access to the night depository 14 may be controlled by a conventional key lock 56. The combined ATM 12 and night depository 14 structure is customarily located so that the customer interface area 26 of the ATM 12 and the outwardly projecting portion 54 of the depository 14 extend through a wall 55 which conceals the remainder of the structure from view. Moldings or trim bezels 60 and 62 for the ATM 12 and depository 14 are provided for weatherproofing and to enhance the appearance of the assembly when installed.

Figure 3:
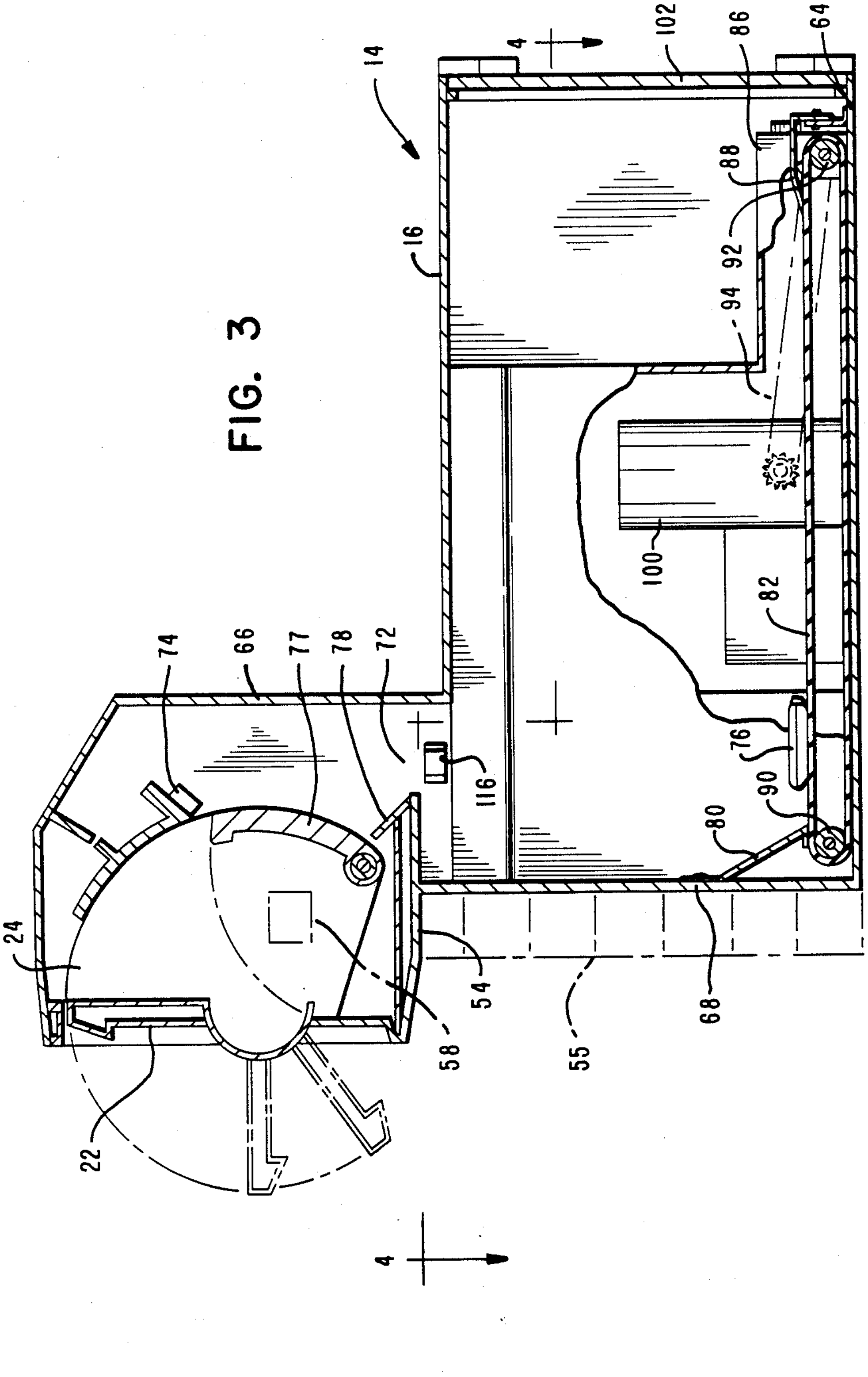
FIG. 3 is a sectional view taken along line 3—3 of FIG. 2.
Figure 4:
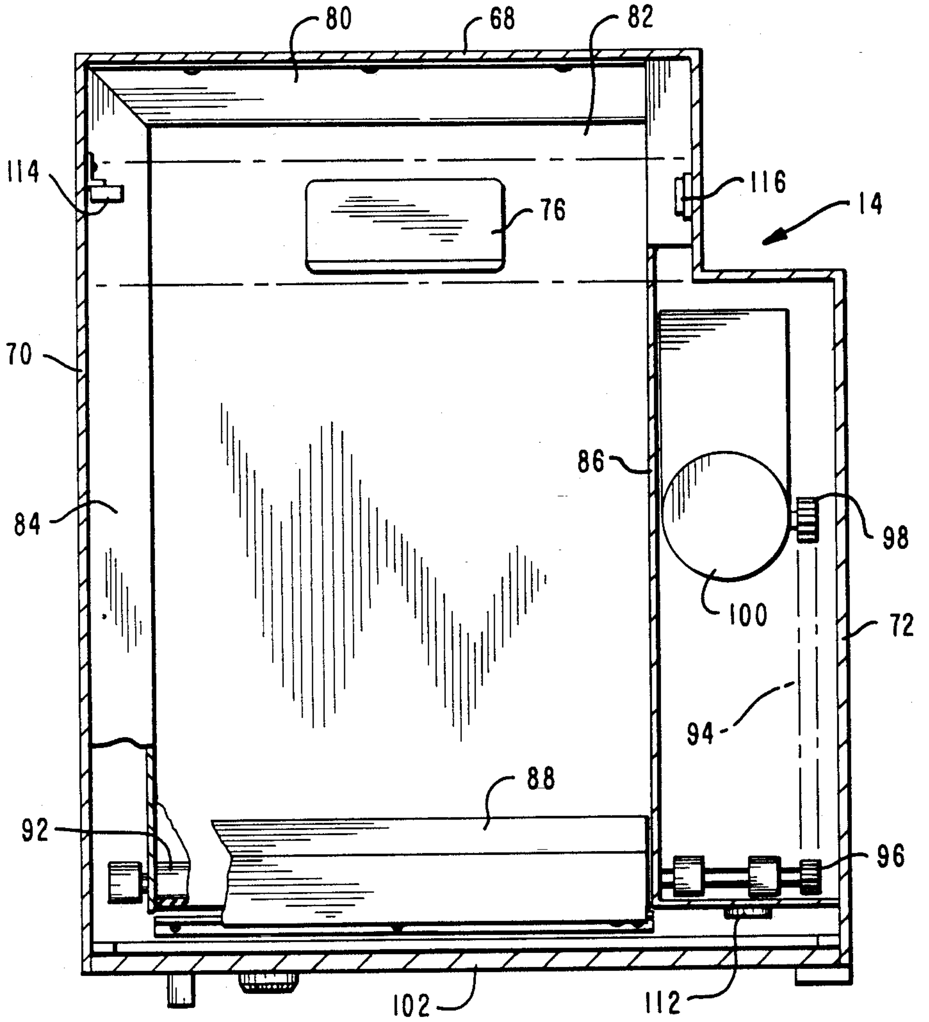
FIG. 4 is a sectional view taken along line 4—4 of FIG. 3.

FIGS. 3 and 4 show the interior of the depository 14, which is fabricated from penetrationresistant materials, such as high-strength steel plate, including a base 64 and walls 66, 68, 70 and 72. As previously indicated, at one end, the depository is provided with a door or closure 22, through which deposits may be placed into the depository 14 by a customer. The drum 24 is associated with the door 22, to receive a deposit when the door is open and to cause the deposit to drop through an aperture 72 into the interior of the depository 14 when the door is closed. The door 22 and drum 24 are of conventional design. A switch 74 is located in proximity to the drum 24 and is actuated by rotation of the drum from open to closed position to provide an indication to the ATM 12 that the drum 24 has been operated.

When a deposit 76 is introduced into the depository 14 via the door 22, the drum 24, and a drum flap 77, and drops through the aperture 72, it is guided by a first deflector 78 and a second deflector 80 to land on a conveyor 82, or on other deposits which have already been dropped into the same area. The first deflector 78 is located adjacent to the drum 24, while the second deflector 80 is placed within the depository 14 and secured to the front wall thereof. These deflectors guide the deposit 76 in its drop and prevent it from landing in a position between the front wall 68 and the end of the conveyor 82, where it might cause a jam. In addition to the front deflector 80, side deflectors 84, 86 and a rear deflector 88 are also provided to keep the deposits in proper position with respect to the conveyor 82.

The conveyor 82 is an endless belt mounted on a front roller 90 and a rear roller 92, which in turn are mounted on the base 64. The rear roller 92 is driven through a chain 94 and gears 96 and 98 by a motor 100 which is also located within the depository 14.

Figure 5:
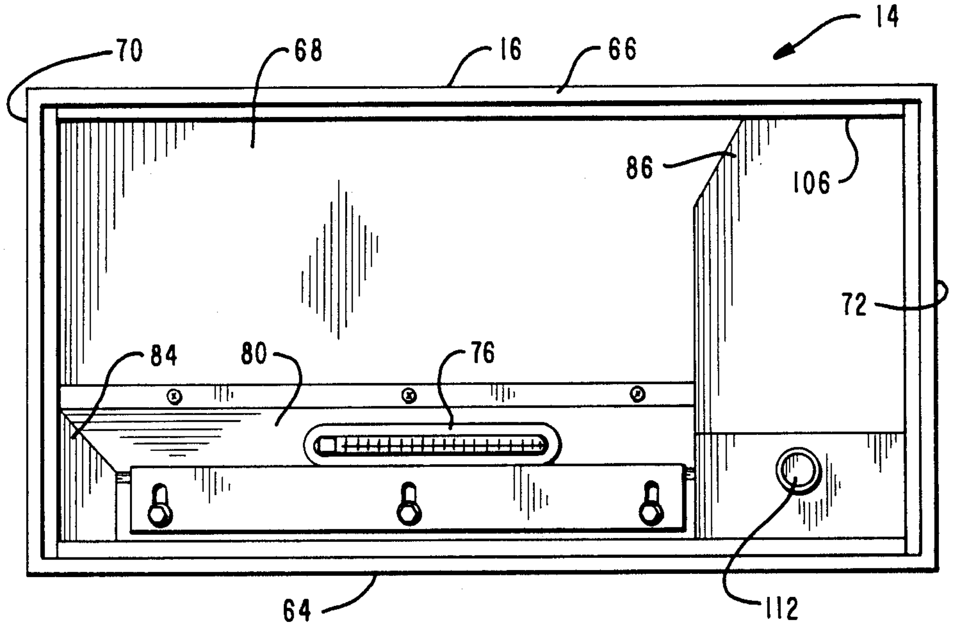
FIG. 5 is a rear view of the night depository with the rear door removed.

At the end of the night depository 14 which is opposite from the door 22, and located adjacent to the rear roller 92 of the conveyor 82, is a second door 102 which is hinged by hinges 104 at one side of its aperture 106, and which is provided with a lock 108 and a handle 110 for secured opening and closing. This door 102 is used by employees of the bank or other institution which owns the night depository 14 for the purpose of periodically removing accumulated deposits 76. Positioned within reach of an employee who opens the door 102 is a switch 112 (FIG. 5) which may be actuated to operate the motor 100 to run the conveyor 82 to bring all deposits 76 to the rearmost position of the conveyor, from which position they can readily be removed from the depository 14 by the employee.

As deposits 76 are dropped through the aperture 72, they will accumulate at the forward end of the depository 14, and could, if left untended, form a pile high enough to jam the operation of the drum 24, so that the drum 24 and door 22 would not close, and might provide access to the night depository 14 and the deposits 76 therein to unauthorized persons. Accordingly, a sensor 114, comprising a combined light source and photocell, is positioned in cooperative relation with a reflector 116 to detect when a pile or deposits 76 reaches a height which breaks the double beam of light extending between the sensor 114 and the reflector 116. Of course, this same double beam of light will be broken momentarily by deposits 76 as they drop through the aperture 72 and onto the conveyor 82, but the circuitry associated with the sensor 114 can be designed, in a well-known manner, to ignore such momentary interruptions and to be operated only by a light beam interruption of relatively longer duration. Such circuit actuation will cause operation of the motor 100 to, in turn, operate the conveyor 82 and carry the accumulated deposits 76 to the rear of the night depository 14, from where they can be removed through the door 102 by an employee of the institution utilizing the night depository system.

Figure 6:
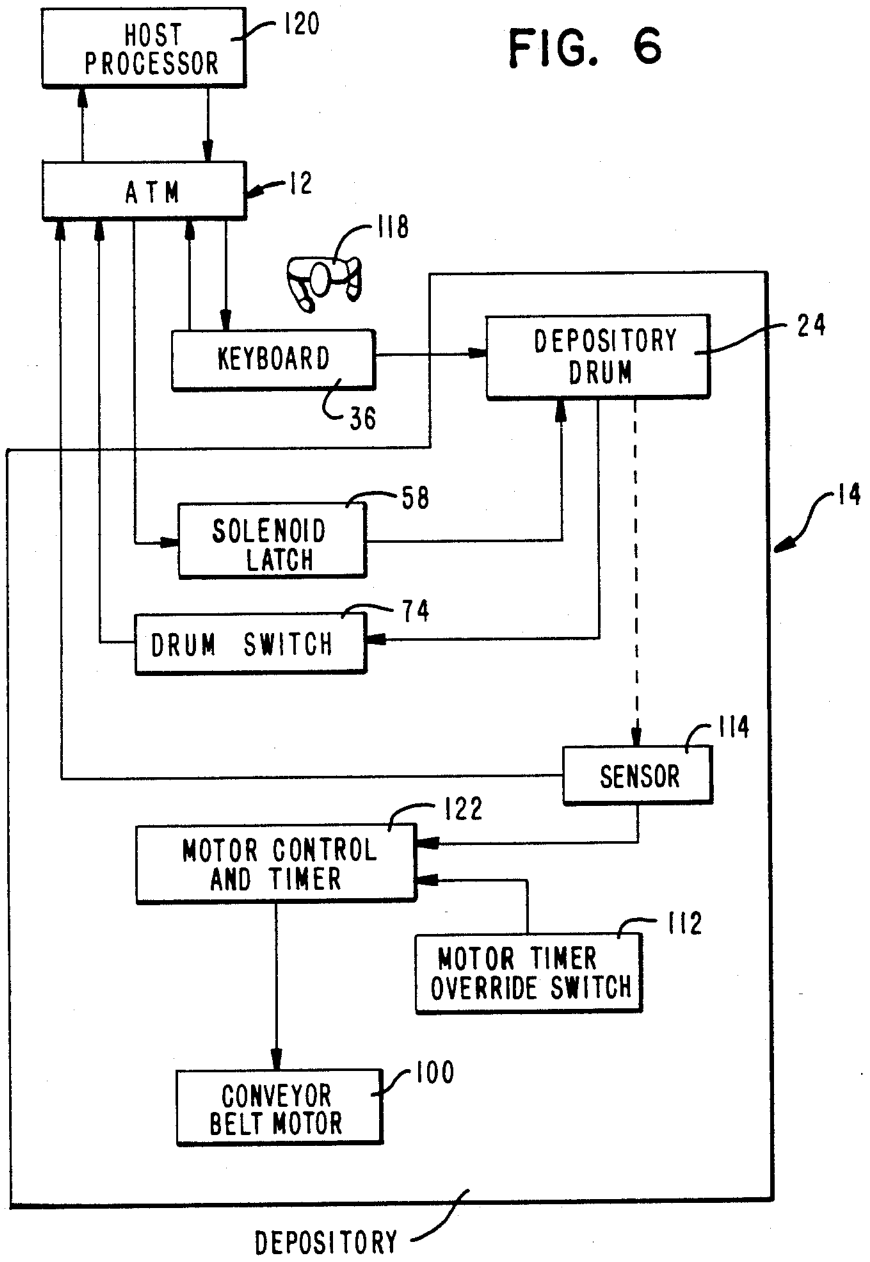
FIG. 6 is a block diagram illustrating various elements of the night depository system of the present invention and the manner in which they are interrelated.

Shown in FIG. 6 is a block diagram illustrating the relationship of the various elements described above. It will be noted that the customer 118 communicates with the ATM 12 by means of the keyboard 36 and the card slot 38 into which the customer introduces a bank or credit card for identification verification purposes. Such verification customarily involves the entry of a personal identification number on the keyboard 36 which is compared by the ATM 12 or a host processor 120 with data on the bank or credit card to establish customer identity. The ATM 12 then, at the direction of the customer 118, operates the solenoid latch 58 associated with the drum 24 of the depository 14, to enable the customer to open the door 22 to make the desired deposit.

Piling up of a plurality of deposits 76 breaks the double light beam between the sensor 114 and the reflector 116, which actuates a motor control and timer 122 to operate the conveyor belt motor 100 for a predetermined length of time to cause the conveyor 82 to shift accumulated deposits 76 to the rear of the night depository 14 to make room for additional deposits 76 to be dropped onto the forward end of the conveyor 82. The sensor 114 also sends a signal to the ATM 12, indicating a "full" condition, which causes the ATM to "close" the depository until the condition has been corrected. An employee can open the rear door 102 of the night depository 14 and operate the motor timer override switch 112 which actuates the motor control and timer 122 to operate the conveyor belt motor 100 for as long as may be necessary to bring all of the deposits 76 to the rear of the depository 14 for removal by the employee.

Figure 7A:
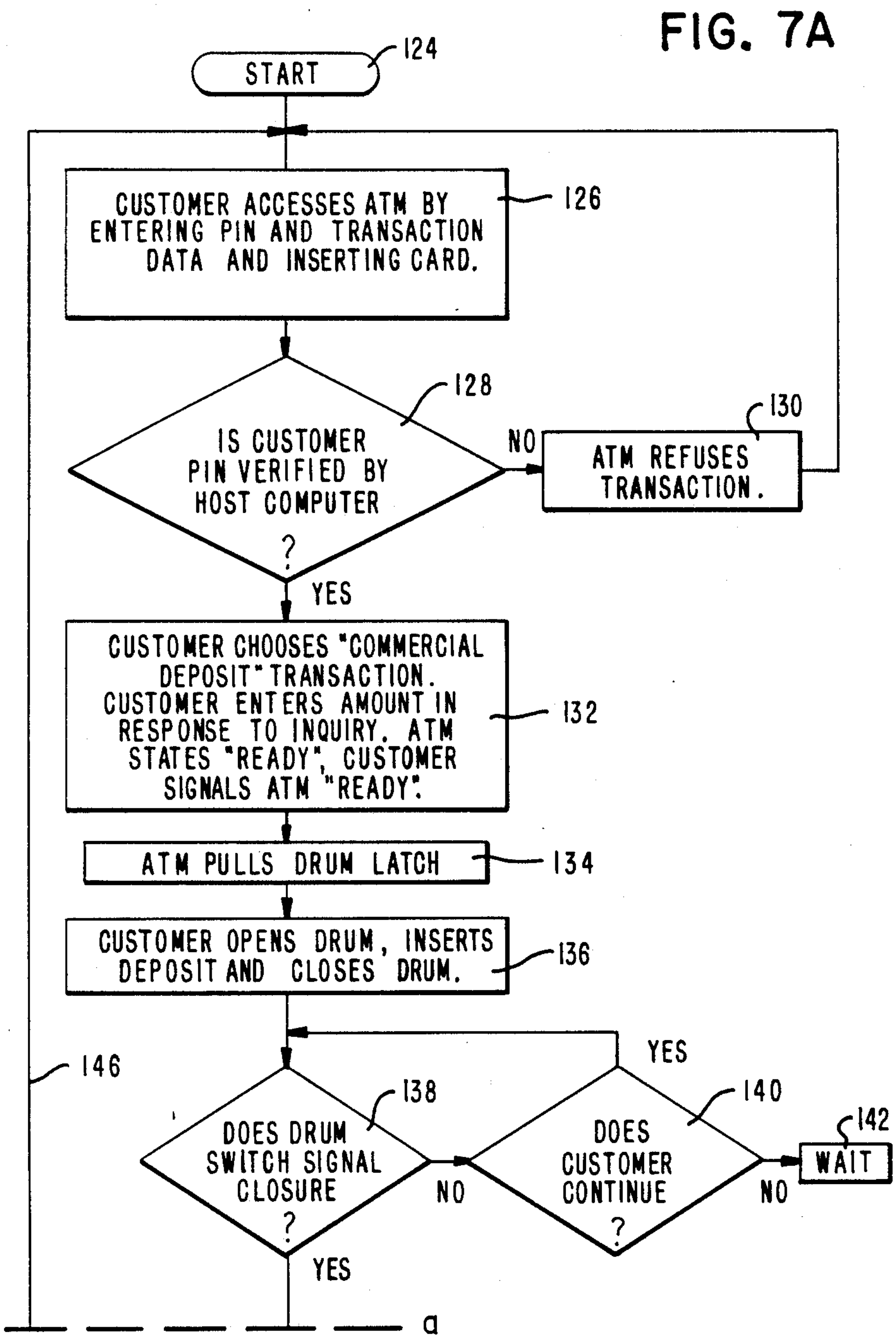
FIGS. 7A and 7B together comprise a flow diagram showing the manner in which the system of FIG. 6 operates during a customer deposit operation.
Figure 7B:
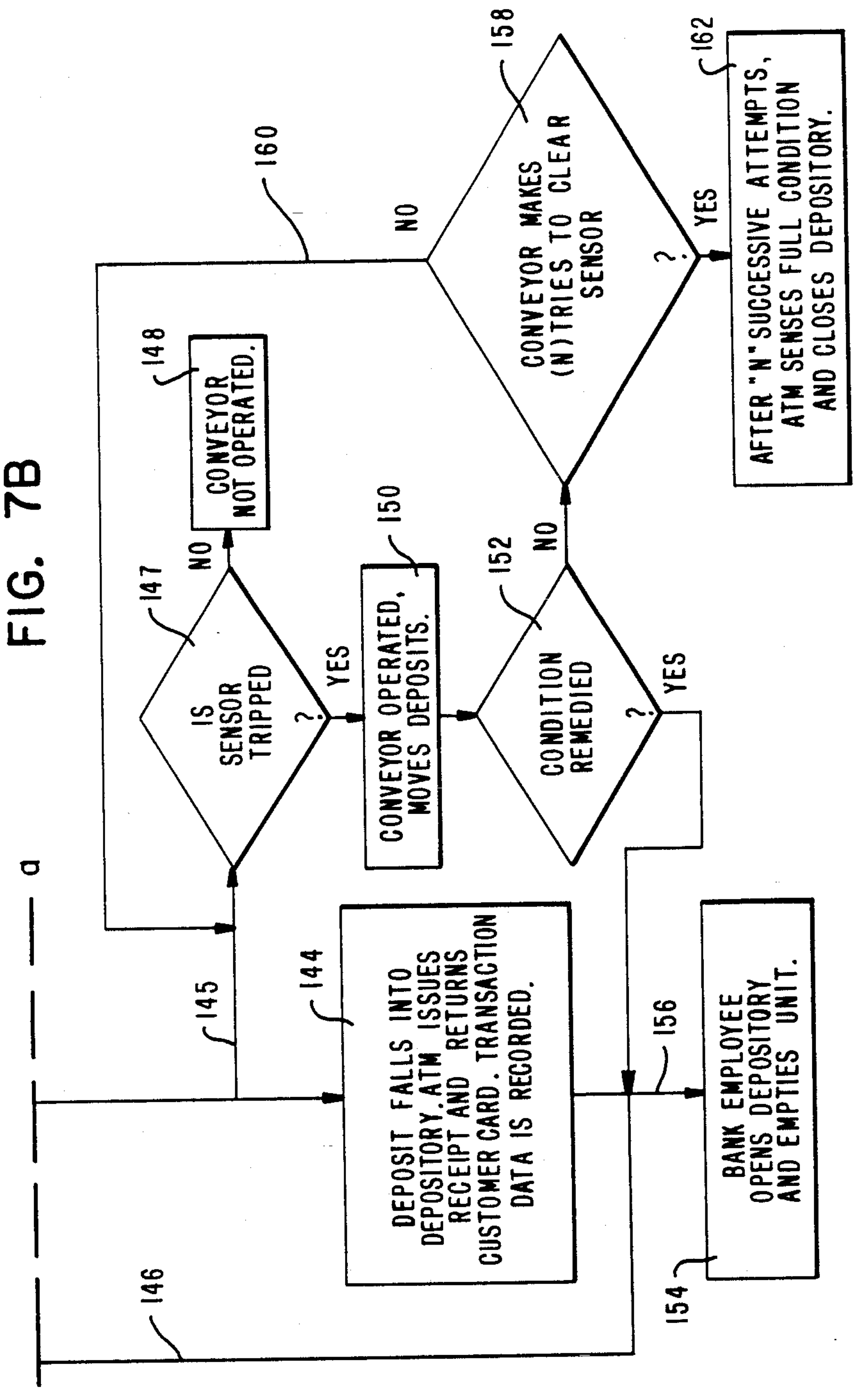

A typical customer-initiated sequence of operation of the depository system of the present invention is shown in the flow diagram of FIGS. 7A and 7B. Following the "start" block 124, as indicated in block 126, a customer having a deposit 76 to be placed in the depository 14 first approaches the system and accesses the ATM 12 by entering a personal identification number (pin) in the keyboard 36 and inserting a credit or bank card in the slot 38 of the ATM 12.

The host processor 120 then performs a customer identification verification operation (block 128). If the verification is positive, the customer 118 is permitted to use the ATM 12, while if the identification is not positive, the ATM 12 refuses a transaction, as indicated in block 130, and the process normally returns to block 126 for a retry, unless retries are not permitted under the designed constraints of a particular system. Assuming that the identification is positive, the customer then chooses a "commercial deposit" transaction, enters an appropriate amount on the keyboard 36 and signals "ready" to the ATM 12 by an appropriate function key 34, in response to a "ready" signal from the ATM 12, all as indicated in block 132. The solenoid drum latch 58 is then pulled or withdrawn by the ATM 12 (block 134), which permits the customer 118 to open the door 22, insert a deposit 76 into the drum 24, and close the drum 24 (block 136).

A determination is then made by the system (block 138) as to whether or not the drum switch 74 signals a proper closure to the ATM 12. If not, the customer decides whether or not to attempt to continue with the operation (block 140). If the customer attempts in some way to continue operation of the system, the process returns to block 138 to determine whether the status of the drum switch 74 has changed. If the customer takes no action, the system goes to a "wait" mode (block 142), which is resolved only by proper closing of the drum 24.

Assuming that the drum switch has signaled a closure, the deposit 76 has fallen into the depository 14, the ATM 12 issues a receipt and returns the card of the customer 118, and records appropriate data relating to the transaction, all as indicated in block 144 of FIG. 7B. The process then returns over path 146 to block 126 of FIG. 7A. At the same time, as represented by path 145, a determination is made (block 147) as to whether or not the sensor 114 has been tripped by a deposit 76 which has been prevented by an accumulation of other deposits from falling fully into the depository 14. If the sensor 114 has not been tripped, the conveyor 82 is not operated, as represented by block 148, and the system will continue to operate in the normal manner.

If the sensor 114 has been tripped, the conveyor 82 is operated to move the accumulated deposits 76 to the rear end of the depository 14, as indicated in block 150. The motor 100 is operated for a predetermined length of time under control of the motor controller and timer 122, after which a determination is made (block 152) as to whether or not the tripped sensor condition has been remedied.

If the condition has been remedied, the system may continue to operate in a normal manner, and at some appropriate time, an employee will open the door 102 of the depository 14 and remove the accumulated deposits 76, as represented by block 154. It will be noted that this action may also follow any individual operation of the system, as represented by path 156 extending from blcok 144 to block 154. The employee may use the override switch 112, if necessary, to cause the conveyor 82 to move all of the accumulated deposits 76 to a position in which they may readily be retrieved through the opening 106 of the rear door 102.

If the condition is not remedied by operation of the conveyor 82, the conveyor will then continue to make a number (represented by "n") of tries to clear the sensor 114, as indicated in block 158. For each try up to "n", the system follows the path 160 back to block 147. If this is unsuccessful in remedying the condition, on the "nth" try, the ATM 12 will sense a full condition and will close the depository 14, as represented in block 162.

While the form of the invention illustrated and described herein is particularly adapted to fulfill the objects aforesaid, it is to be understood that other and further modifications within the scope of the following claims may be made without departing from the spirit of the invention.

What is claimed is:

1. A method for receiving customer deposits in a night depository operatively associated with an automated teller machine (ATM), comprising the following steps:

a. receiving at the ATM a customer entry of personal identification and transaction data;

b. verifying the identity of the customer;

c. releasing a latch means to enable the customer to open a closure of the night depository, make a deposit in the night depository, and close the closure;

d. enabling the deposit to drop into a conveyor area, which includes a conveyor, in the night depository;

e. sensing, by a sensor, the height of deposits reposing in the conveyor area;

f. operating the conveyor to reposition the deposits in the night depository when the height of the accumulated deposits exceeds a predetermined value as determined by the sensor;

g. generating a signal by the depository to the ATM that the deposit has been made;

h. recording data pertaining to the transaction in the ATM; and i. issuing a receipt to the customer by the ATM relating to the deposit.

2. The method of claim 1, also including the steps of removing deposits from the night depository by an authorized employee by opening a second closure in the night depository, operating the conveyor to bring accumulated deposits to the vicinity of the second closure, and manually removing said deposits.

3. The method of claim 1 in which the ATM retains a customer identification card during step (a) and returns said card during step (i).

4. The method of claim 1 in which the night depository transmits a signal to the ATM during step (g) when the night depository is full and can accept no more deposits until it is emptied.

5. The method of claim 1 in which the customer identification verification of step (b) is carried on by a host processor.

6. The method of claim 1 in which the operation of the conveyor in step (f) is for a predetermined period of time.

7. A night depository system for receiving customer deposits, maintaining a record of such deposits, and providing a receipt to a customer making such a deposit comprising, in combination:

customer operated means for receiving customer identification and transaction data and for controlling access to a night depository;

means for verifying the identity of the customer;

a night depository for receiving customer deposits;

closure means for the night depository to enable deposits to be placed within said night depository;

latch means for said closure means controlled by said customer operated means;

switch means operatively coupled to said closure means to provide a signal to said customer operated means as to whether said closure is opened or closed;

conveyor means for transporting deposits which have been placed in the night depository to prevent such deposits from accumulating in a position adjacent to said closure means;

sensing means for sensing when an accumulation of deposits adjacent said closure means exceeds a predetermined quantity; and motor means controlled by said sensing means for operating said conveyor means for moving said accumulated deposits from said position adjacent said closure means to a remote position.

8. The night depository system of claim 7, also including a second closure means, for the night depository, which can be opened by an authorized person to remove accumulated deposits.

9. The night depository system of claim 8 in which the second closure means is located at a position remote from said first closure means.

10. The night depository system of claim 8 in which the second closure means is a hinged door.

11. The night depository system of claim 8, also including manually operable conveyor operating means to cause accumulated deposits to be transported to a position adjacent to said second closure means to facilitate ready removal from the night depository by an authorized person.

12. The night depository system of claim 7, also including timing means for timing the duration of operation of the motor means for operating said conveyor means.

13. The night depository system of claim 7 in which the customer operated means comprises of an automated teller machine.

14. The night depository system of claim 7 in which the means for veryifying the identity of a customer is a host data processing system.

15. The night depository system of claim 7 in which said closure is a rotatable apertured drum in which deposits can be placed.

16. The night depository system of claim 7 in which said latch means comprises a solenoid latch.

17. The night depository system of claim 7, also including a deflector within the night depository for guiding movement of a deposit as it enters the night depository through said closure means to a position or on adjacent to the conveyor means.

18. The night depository system of claim 7 in which the night depository is made of high strength material to prevent unauthorized access thereto.

19. The night depository system of claim 13 in which the night depository and the automated teller machine are complementarily configured and the automated teller machine is positioned atop the night depository.

20. The night depository system of claim 19 in which the closure means is provided at the front of the night depository and includes a rotatable drum receptacle, in which a door for removal of accumulated deposits is provided at the rear of the night depository, and in which a flat horizontal surface for supporting the automated teller machine forms a portion of the top of the night depository.

21. A night depository system for receiving customer deposits, maintaining a record of such deposits, and providing a receipt to a customer making such a deposit, comprising, in combination:

an automated teller machine for receiving customer identification and transaction data and for controlling access to a night depository; and a night depository for receiving customer deposits, having deposit closure means for receiving customer deposits controlled by said automated teller machine, and being configured to rest upon a floor and to support the automated teller machine thereabove.

22. The night depository system of claim 21, in which the automated teller machine has a customer interface area on a front surface thereof including a keyboard and a card slot for customer interaction, and in which the deposit closure means of the night depository is positioned directly below the customer interface area of the automated teller machine to facilitate customer usage of the night depository system.

* * * * *

UNITED STATES PATENT AND TRADEMARK OFFICE
CERTIFICATE OF CORRECTION

PATENT NO. : 4,754,126

DATED : June 28, 1988

INVENTOR(S) : John P. Caldwell

It is certified that error appears in the above-identified patent and that said Letters Patent is hereby corrected as shown below:

Column 8, line 22, delete "veryifying" and substitute --verifying--.

Column 8, line 32, delete "or on" and substitute --on or--.

Signed and Sealed this

Twenty-seventh Day of September, 1988

*Attest:*

DONALD J. QUIGG

*Attesting Officer* *Commissioner of Patents and Trademarks*

UNITED STATES PATENT AND TRADEMARK OFFICE
Certificate

Patent No. 4,754,126

Patented June 28, 1988

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:
Melvin L. Walter and John P. Caldwell Signed and Sealed this 7th Day of August 1990.

STUART S. LEVY

*SPE, Art Unit 239*